(12) United States Patent
Günther et al.

(10) Patent No.: US 10,081,493 B2
(45) Date of Patent: Sep. 25, 2018

(54) CONVEYOR SYSTEM WITH HEIGHT-ADJUSTABLE CONVEYOR BODIES

(71) Applicant: Wipotec GmbH, Kaiserslautern (DE)

(72) Inventors: Oliver Günther, Katzweiler (DE); Kay-Eric Schmidt, Mehlingen (DE)

(73) Assignee: Wipotec GmbH, Kaiserlautern (DE)

(*) Notice: Subject to any disclaimer, the term of this patent is extended or adjusted under 35 U.S.C. 154(b) by 0 days.

(21) Appl. No.: 15/668,947

(22) Filed: Aug. 4, 2017

(65) Prior Publication Data
US 2018/0037419 A1 Feb. 8, 2018

(30) Foreign Application Priority Data
Aug. 5, 2016 (DE) .................. 10 2016 114 604

(51) Int. Cl.
*B65G 15/16* (2006.01)
*B65G 41/00* (2006.01)
*B65G 15/14* (2006.01)

(52) U.S. Cl.
CPC ............ *B65G 15/16* (2013.01); *B65G 15/14* (2013.01); *B65G 41/003* (2013.01); *B65G 2207/08* (2013.01)

(58) Field of Classification Search
CPC ........ B65G 15/12; B65G 15/14; B65G 15/16; B65G 21/10; B65G 21/12; B65G 41/003; B65G 41/007; B65G 2207/08
USPC ................ 198/586, 626.1, 626.3, 817, 861.1
See application file for complete search history.

(56) References Cited

U.S. PATENT DOCUMENTS

| 4,464,884 A | * | 8/1984 | Franks | ..................... B65B 59/02 |
| | | | | 198/415 |
| 5,966,901 A | * | 10/1999 | Komp | ................... B65B 59/005 |
| | | | | 198/626.3 |
| 6,390,282 B1 | * | 5/2002 | Ouellette | ............... B65G 15/14 |
| | | | | 198/502.2 |
| 7,044,707 B2 | * | 5/2006 | Garin | ..................... B65G 15/14 |
| | | | | 198/626.1 |
| 7,909,159 B1 | | 3/2011 | Zats | |
| 8,783,447 B1 | * | 7/2014 | Yohe | .................. B65G 21/2054 |
| | | | | 198/626.5 |

(Continued)

FOREIGN PATENT DOCUMENTS

| CN | 201817034 U | 5/2011 |
| CN | 202828707 U | 3/2013 |

(Continued)

OTHER PUBLICATIONS

German Patent Office Action dated Apr. 11, 2017 in German counterpart application DE 10 2016 114 604.8, and partial English translation of pp. 2 and 3.

(Continued)

*Primary Examiner* — Gene O Crawford
*Assistant Examiner* — Keith R Campbell
(74) *Attorney, Agent, or Firm* — The Culbertson Group, P.C.

(57) ABSTRACT

A conveyor device includes at least three lift columns, a lower conveyor body, and an upper conveyor body. The upper conveyor body is adjustable in its height relative to the lower conveyor body. The lift columns project at least partially above the upper conveyor body without lengthwise supports acting in the transport direction.

16 Claims, 9 Drawing Sheets

(56) References Cited

U.S. PATENT DOCUMENTS

| | | |
|---|---|---|
| 2003/0192648 A1* | 10/2003 | Massarotto ........... B29C 44/304 |
| | | 156/557 |
| 2011/0076128 A1 | 3/2011 | Johnsen |
| 2013/0192764 A1 | 8/2013 | Stoila et al. |
| 2013/0220774 A1 | 8/2013 | Werner |
| 2014/0345519 A1* | 11/2014 | Palumbo ............ B05B 13/0221 |
| | | 118/300 |

FOREIGN PATENT DOCUMENTS

| | | |
|---|---|---|
| CN | 103979252 A | 8/2014 |
| CN | 103 787 025 B | 4/2016 |
| JP | H06255733 A | 9/1994 |

OTHER PUBLICATIONS

Partial European Search Report dated Dec. 19, 2017 in EP 17 18 3627.

European Full Search Report dated Apr. 16, 2018 in EP 17 18 3627.3.

* cited by examiner

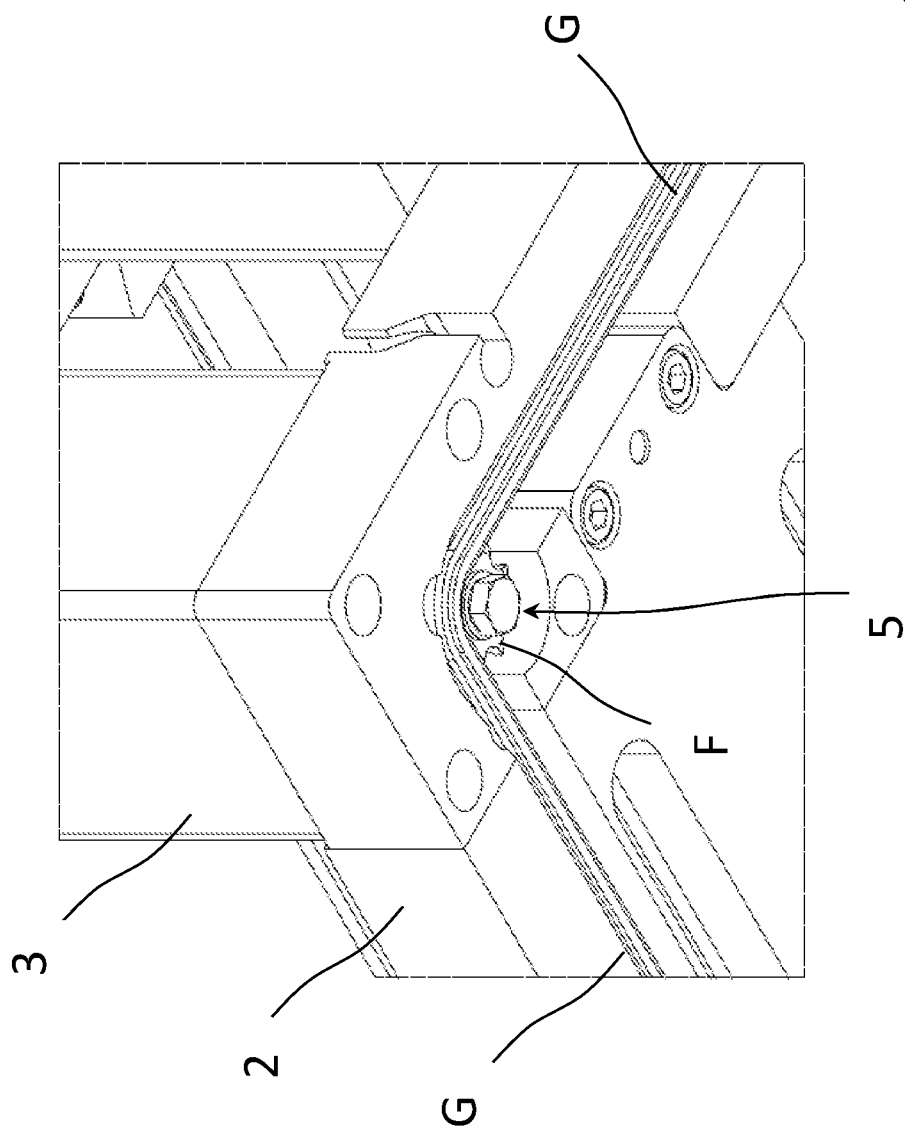

CONVEYOR SYSTEM WITH HEIGHT-ADJUSTABLE CONVEYOR BODIES

TECHNICAL FIELD OF THE INVENTION

The present invention concerns conveyor systems, and, more particularly, conveyor systems for transporting discrete goods between upper and lower conveyor bodies.

BACKGROUND OF THE INVENTION

Conveyor systems for transporting discrete goods between upper and lower conveyor bodies are used in the prior art in connection with labeling and control as well as tracking goods. For example, such conveyor systems may be used to transport packages containing pharmaceutical products, packaged foods, or other products that have or are to obtain one or more labels and/or whose labeling is to be detected for control purposes. Such labeling and inspection devices are preferably arranged very close to each other, so as to occupy little space in production plants. Conveyor systems may also be used in connection with serialization and aggregation of individual packages into bundles or containers, for which the individual packages (or groups of packages formed from them) are to be checked or processed with regard to their labels or other properties.

In order to handle goods having different properties (shape/geometry, material, color, weight, etc.) in a modern fully automated production or inspection plant, such plants must have high flexibility. Since the goods (also sometimes referred to as "products" in the following) must preferably be moved through the plants at high speeds (for example, 1 to 4 m/sec), the adjustment and changeover for handling goods with different properties must take place rapidly and error free.

Conveyor units having a lower and an upper conveyor belt are known for handling goods of different properties. A good to be processed is transported in such a conveyor unit between the lower and upper conveyor belts, either lying only on the lower conveyor belt or being clamped at the same time by the upper conveyor belt. In clamped state the goods can move accurately in time and position, so that, for example, a label provided as an imprint can be placed on the package/good at a predetermined application place very precisely even at high transport speeds, often with tolerances of a few hundredths of a millimeter. This high-precision movement or positioning of the transported goods is of crucial importance for quality when applying labels (printing barcodes, among other things) or in label detection (by scanner or camera), for example for purposes of quality assurance.

Forming the upper as well as the lower conveyor belt each from two conveyor bodies that are spaced apart side-by-side is also known. This arrangement of side-by-side conveyor bodies, each with a respective belt for example, allows the placement of or action by processing tools, for example printing heads, cameras, scanners, light gates, etc., even between the laterally spaced conveyor belts, in order to easily reach, for example, the bottom area of a package. Also, the laterally spaced belts prevent a rotation of the goods during transport. Another advantage lies in the fact that the goods can lie on the belts of the lower conveyor bodies distinctly spaced at their side edges, so that safety labels or seals can be applied on the side of the good without problem and can be shifted to the top or bottom side while the good is held between the upper and lower conveyor belts. Preferably, the processing takes place dynamically, thus while the goods are moving. Theoretically, a purely static processing is also conceivable, for which the goods can briefly be stopped. While the lower conveyor bodies are preassembled largely without a change in their height, the upper conveyor bodies are variably adjustable in height via a lift mechanism in order to be able to transport goods of different heights clamped between the upper and lower conveyor belts.

SUMMARY OF THE INVENTION

Where goods have been transported between upper and lower conveyors, the access to the transported goods is limited by frames or stiffening elements that serve to suspend the conveyor belts or are intended to stabilize them. Access from all sides to the goods carried between the conveyor belts is hindered by this and the flexibility of the conveyor system is correspondingly limited. It is therefore an object of the present invention to provide a conveyor system in which goods are transported between upper and lower conveyors while allowing access to the conveyed goods or their package surface on all sides.

This object is accomplished according to the present invention by mounting height-adjustable conveyor bodies on lift columns. This lift column arrangement allows the conveyor bodies to be supported without additional frames or stiffening elements which would hinder access to the conveyor bodies or to the goods transported by them. The height adjustment takes place according to an aspect of the invention by means of four spindles positioned at the corners of a quadrilateral, in particular a base frame for the conveyor apparatus, with each spindle carrying at least one spindle nut. Cross braces, to which the upper conveyor bodies are affixed and which are held by the spindle nuts, run transverse to the transport direction. By rotating the spindles, the height of the cross member and thus the upper conveyor bodies can be variably adjusted. An especially good access to the transported goods is achieved by the fact that supporting and stabilizing the lift columns to each other above the upper conveyor bodies by lengthwise or transverse connectors is at least partially omitted. Through this, in particular, a lengthwise carrier supporting all of the lift columns or spindles in the transport direction can be omitted, so that the space freed up by this can be used for positioning or for the use of processing tools. Compared to the prior art, a conveyor system according to the present invention can be made still more compact and space saving by omitting or limiting lengthwise and transverse connectors between the lift columns or spindles.

A system made of the components "spindle nut" and "spindle" should be understood in the broadest sense to mean any system of form-fit or mechanically cooperating components that form a power transmission system in which a linear movement is produced from a rotary movement. Thus a spindle according to the present invention may also be designed as a gear rack, while the spindle nut comprises a driven gear wheel that rolls on the gear rack. Conversely, a spindle nut according to an embodiment of the present invention could also comprise a gear rack coupled to a conveyor body, preferably a vertical rack, which can be moved up and down over a driven pinion disposed on a base frame (the pinion in this case comprising a "spindle"). In one embodiment of the invention, the spindle comprises a screw-like shaft, along which a nut (spindle nut) that has a profile complementary to the shaft profile travels in response to rotation of the screw-like shaft about its longitudinal axis.

A conveyor system according to a first embodiment comprises a base frame which extends in a preferably horizontal transport direction X and likewise preferably horizontal width direction Y running transverse thereto. The base frame supports, directly or indirectly, at least one lower conveyor body, which is disposed at a height in a height direction Z running perpendicular to the transport direction X and the width direction Y. In some forms of this embodiment, the height of the at least one lower conveyor body is essentially fixed and is not variable with respect to the base frame. The "transport direction X" can, in what follows, be both the direction X and its opposite direction. Both cases are intended to be included under "transport direction X." The base frame in this embodiment additionally supports four lift columns, which are disposed on the base frame at the corners of an imaginary quadrilateral, in particular a rectangle, and each extends upward in the Z direction. The length and width of the imaginary rectangle may (but not necessarily) correspond to those of the base frame, so that the lift columns stand at the corners of the base frame. A spindle in this embodiment is disposed on each lift column with its longitudinal axis extending in the Z direction, so that the respective spindle can move a spindle nut operatively associated therewith in the Z direction upward or downward by rotation of the spindle about its longitudinal axis. The spindle nuts in this case carry jointly at least one upper conveyor body, which is freely adjustable in its height because of the ability of the spindle nuts to move vertically, that is, in the Z direction relative to the base frame. Of course in other embodiments, the at least one lower conveyor body can be affixed to the lift columns instead of to the base frame.

Instead of the corners of a rectangle, the lift columns could also be disposed at the corners of a trapezoid or other quadrilateral, if space constraints require this. Thus, for example, one pair of lift columns could be farther apart in the Y direction than the other pair. Generally speaking, the lift columns are positioned so that access to the space circumscribed by them is guaranteed in the best way possible for the disposition of processing tools.

According to one aspect of the invention, at least one lift column is not connected to another lift column by a fixed lengthwise connector running in the X direction above its spindle nut. Through the intentional omission of one such lengthwise stiffener for at least one lift column, there immediately results an improved access into the space that is defined by the upper ends of the four lift columns or their lower base points on the base frame in the shape of a cuboid (a lengthwise connector running in the X direction is understood to mean a supporting element that connects two lift columns that are spaced apart in the X direction either directly or indirectly).

The fact that the at least one lift column is weakened in its stability in the X direction because of the lack of support in that direction is advantageously more than compensated by the improved accessibility of the said frame that results from this. This applies in particular when the forces (in particular, accelerating or braking forces of the upper conveyor bodies) acting on the columns in the X direction are low and/or two or all three of the remaining lift columns are still counter-supported in the X direction.

This case would be given, for example, by an L-shaped top frame, which supports three of the four lift columns at their relevant upper ends, where one side of the L extends in the transport direction X and the other side of the L shape extends in the Y direction. Also, an embodiment in which the lift columns opposite each other in the Y direction are connected by a cross member without provision of a lengthwise support going in the X direction creates unhindered access to the goods transported between the upper and lower conveyor bodies from above.

An additionally embodiment provides that at least one lift column is not connected in a supporting way either in the X or in the Y direction to another lift column above its spindle nut, thus projecting freely upward in the Z direction. This solution of course no longer comprises the case that lift columns opposite each other in the Y direction are counter-supported by means of cross members. However, the access around the at least one free standing lift column in the space described above is further improved.

Another embodiment of the invention provides that at least two lift columns are disposed without lengthwise and transverse connectors to other lift columns, thus projecting freely upward in the Z direction. This solution comprises the case that the two other lift columns are connected to each other in the lengthwise or transverse direction or are likewise designed to project upward in a free standing way in the Z direction. An L-shaped top frame no longer falls under these criteria, so that once again an improved access into the inner space results.

In yet another embodiment, all lift columns are designed to be free standing in order to have maximum freedom of access.

An especially good access into the space described by the lift columns results further in embodiments in which an X spacing of the lift columns that stands above the at least one lower conveyor body is at least half as large as the X length of an upper or lower conveyor body. The maximum width in the Y direction of the conveyed goods is preferably determined exclusively by the Y spacing of the lift columns that exists in the intermediate space between the at least one lower conveyor body and the at least one upper conveyor body. Expediently, this spacing is as large as possible, in order to be able to convey relatively wide goods.

According to another embodiment of the invention, each of the spindles disposed on each lift column together with the associated spindle nuts forms a lift mechanism, and all four lift mechanisms are coupled together and can be synchronously actuated manually or automatically. The coupling serves to set all spindles into rotation at the same time so that all spindle nuts move equally upward or downward. A uniform lifting or lowering of the at least one upper conveyor body carried by the spindle nuts takes place through this. Because of the coupling of all spindles, this height adjustment can take place not only rapidly, but also with high precision, so that the upper conveyor body or bodies undergo absolutely translational motion. The coupling can expediently be realized in that each spindle has at its lower end (above, within, or under the base frame) and at the same height, a gear wheel or a pulley wheel that is non-rotatably connected to the spindle, and an appropriately tensioned matching chain or toothed belt passes in a closed loop around all gear wheels or pulley wheels of the individual lift columns. By manual or motor rotation of at least one of the four spindles, the other spindles undergo the same rotary motion because of the coupling in this arrangement, so that the spindle nuts carried by the spindles all move upward or downward at the same time and uniformly. This avoids a tilting or distortion of the cross members or the conveyor bodies between the lift columns. A manual drive can be formed, for example, by a small crank arm, a hand wheel, or an adjusting screw, which is connected with the associated spindle nonrotatably at an upper end of a lift column. To be sure, the combination of a plurality of manually actuatable hand wheels or automatically operated drives that can engage one or more of the spindles, as desired, is also possible. Automatic drives could in this case be electronically synchronized, so that a mechanical coupling of the individual spindles could even be omitted in this case.

In the mechanically coupled spindle arrangement described in the preceding paragraph, a chain used instead of a toothed belt advantageously allows the removal or insertion of elements, so that varying Y or X spacings of the individual spindles can also be more easily realized. Moreover, compared to the use of a toothed belt, the danger of skipping a tooth is reduced and a chain is more robust and wear resistant than a toothed belt.

In some implementations each spindle nut is provided with a linear guide that prevents the relevant spindle nut from twisting in an X-Y plane and/or tipping relative to an X-Y plane. An especially precise guiding of the spindle nuts and thereby the at least one upper conveyor body results from this linear guide arrangement.

According to some embodiments of the invention, a cross member extends from a spindle nut or a holder mounted thereon to the spindle nut or a holder mount thereon of the lift column lying opposite in the Y direction. The at least one upper conveyor body in such an embodiment is mounted movable in the Y direction on this cross member. While the cross member can be positioned in the Z direction due to the ability of the spindle nut to move vertically, the positioning of the at least one conveyor body in the Y direction takes place by transverse shifting of the conveyor body in the Y direction along the cross member. The shifting in the Y direction may take place manually. However, an automatic positioning in the Y direction may also be included in some implementations, for example by linear drives. The cross member may extend as far as possible in the Y direction, so that the at least one upper conveyor body can correspondingly freely be positioned over the entire width to a suitable Y position within the frame defined by the lift columns. For an implementation in which two upper or lower conveyor bodies are provided, both conveyor bodies are mounted on the cross member so that they can be shifted in the Y direction and are for this reason both correspondingly freely positionable.

In order to be able to position the at least one upper and also the at least one lower conveyor body stably, at least two cross members are provided per conveyor body and are supported by lift column pairs that are opposite from each other in the Y direction. While the at least one upper conveyor body is held by vertically movable spindle nuts and the cross members connected to them, the cross members supporting the lower conveyor bodies may be fixed in place on the lift columns or the base frame. However, in some embodiments of the invention the height of the at least one lower conveyor body is also adjustable, for example through latching, clamping, or adjusting mechanisms. This gives the advantage that the height position of the at least one upper conveyor body is not necessarily set by the vertical thickness of the package to be transported. Instead, upper and lower conveyor bodies can assume a vertical distance to be established between them at different heights. This again increases the flexibility of the conveyor system.

Although the use of only one lower and only one upper conveyor body for transport of the goods to be transported could be sufficient in some applications (and in this case would offer maximum accessibility to conveyed goods), some embodiments of the invention my include at least two upper and/or lower conveyor bodies in order to better establish the position of the conveyed good in the space. Thus, an upper conveyor body could be used together with two lower conveyor bodies that are spaced apart in the Y direction, so that, looking in the transport direction X, there are three contact points between the belts of the conveyor bodies and the product. Conversely, two upper conveyor bodies could lie opposite one lower conveyor body. An especially expedient and stable product transport results from the use of two upper and two lower conveyor bodies that are spaced apart in the Y direction, so that four contact points or lines between the conveyor bodies and the product result. A rotation and/or shifting of the products during transport is largely excluded by this arrangement of conveyor bodies. Furthermore, the product transported or held in this way is also secured as well as possible against tilting about an imaginary tilting axis running in the transport direction X by selecting the Y spacings of the conveyor bodies to be as large as possible.

According to some forms of the invention the upper and lower conveyor bodies are aligned with each other in the Z direction. However, this alignment in the Z direction is not absolutely necessary. Rather, the ability of each individual conveyor body to be shifted horizontally along its cross member allows any desired positioning of each conveyor body in the Y direction, so that a product can be held on its top side, for example, by two closely disposed upper conveyor bodies, while the lower conveyor bodies are spaced farther apart in the Y direction. Such an arrangement may be used where the product is to be provided with an imprint in the middle of its bottom side. The lower conveyor bodies positioned far apart will not interfere with this. A seal that is to be wrapped under on the side wall could be applied at the edge of the top side of the product, so that the upper conveyor bodies that lie close to each other at the top of the product likewise are not a problem here.

The arrangement of the upper conveyor bodies with the cross members carrying them, their mounts on the spindle nuts, and a motor driving the upper conveyor bodies may be, as a whole, also referred to as the "upper conveyor." Correspondingly, the arrangement of the lower conveyor bodies and their motor, the associated cross members, and their mounts on the lift columns or the base frame may be referred to as the "lower conveyor."

According to some embodiments of the invention, a cross member carrying a conveyor body has a series of latch teeth along its Y extent. The latch teeth serve to precisely set the Y position of the conveyor body along the cross member and to maintain that position reliably. In addition, the precise positioning made possible by the latch teeth help prevent a misalignment of the belt (and thus the transport device) or a tilting of the conveyor body.

The latch teeth form a part of a latching mechanism, which can be actuated automatically or manually (including manually without the use of tools). Such a mechanism may also include a latching lever coupled to the conveyor body. The latching lever can be moved from a released position, in which it releases the latch teeth, into an operating position, in which an engagement into one or more of the latch teeth takes place, in order to fix the conveyor bodies in their Y position along the cross member. The latching lever can, in the operating position, mesh into the latch teeth of the cross member directly. Alternatively, the engagement can be brought about through an intermediate part connected to the latching lever, where the intermediate part in turn engages or releases the latch teeth. The engagement can also take place simultaneously in a plurality of latch teeth in order to achieve an especially stable positioning. Preferably, each conveyor body has at least two latching mechanisms, of which each one interacts with one of at least two cross members, which support the conveyor bodies.

If the positioning of the conveyor bodies in the Y direction takes place automatically, for instance through linear drives with encoders, latching mechanisms as described in the preceding paragraph may be omitted.

In the released position the conveyor bodies can, according to the invention, freely shift along the cross member in the Y direction. In order to facilitate the assumption of a predefined Y position, the cross member can have a grid-like profile in the Y direction, in which a mechanical positioning aid engages, in addition to the latch teeth. This can be a series of recesses made close to each other in the cross member in the Y direction, in which a spring loaded ball on the latching mechanism engages. During the shifting, the balls, which project in succession into the individual profile recesses, specify a corresponding selection of Y positions, which, for example, lie at a spacing of preferably 2 to 5 mm. The balls push the latching mechanism out from the in-between shift positions. Moreover, the recesses may be selected so that at these positions the latch teeth of the cross member are offset from the latch teeth of the latching lever or the intermediate part, so that by pivoting the latching lever at these positions, the mutual engagement of the latches is easily possible and, for instance, two teeth do not interfere with each other. The latch teeth of the cross member can also serve as profile recesses at the same time in that the spring-loaded balls run on the latches, instead of having to engage in recesses specially provided for them.

Additional embodiments of the invention may be configured such that a segment of the latching lever projects into the region between the upper and lower conveyor bodies in the released position. In this position, it is not possible to transport goods, since the transported goods strike the projecting lever segment and immediately become visibly stuck. This informs the operator that the conveyor belt is not yet secured in its Y position along the cross member, and therefore the latching lever still must be set into its operating position.

Each conveyor body may comprise at least one circulating endless belt, which is turned and/or driven in the transport direction over front and rear pulleys or rollers. The Y width of the belt is preferably rather small in order not to cover too much of the surface of the transported packages. The thickness of the belts in the Z direction is basically freely selectable and is governed by the requirements on the forces of friction to be applied between package and belt in the X and Y direction or clamping forces in the Z direction. For example, the belts of the at least one lower conveyor body may be about 1 mm thick, while the belts of the at least one upper conveyor body may have a thickness of about 2 to 3 mm. In each case according to flexibility and compressibility, in particular, of the belts of the upper conveyor body, variations in the height of the individual packages can also be compensated by this.

The belt of at least one upper and/or lower conveyor body may be driven by a motor in order to transport the goods situated between the conveyor bodies (driving just one belt could be sufficient if the belt of the other conveyor body runs in a sufficiently low friction way and can be moved along with the other one). The motor driving the at least one upper conveyor body is preferably affixed to a spindle nut or a mount disposed thereon, together with one of the cross members, which supports the at least one conveyor body, so that the motor can move together with the conveyor body in the Z direction.

The motor for the lower conveyor body (this motor can likewise move in the Z direction according to some embodiments) is preferably attached to the base frame, the lift columns, or a mount disposed thereon, together with one of the cross members for the lower conveyor body. The largely identical construction of the upper conveyor and lower conveyor allows the use of like parts, which advantageously reduces the diversity of parts and the warehousing costs.

A shaft may extend from each motor in the Y direction to a pulley of the at least one associated conveyor body, in order to transmit a torque to the respective conveyor belt. The pulley is in this case mounted on the shaft nonrotatably, but capable of being shifted in the Y direction, in order to be able to freely position the conveyor body in the Y direction.

An especially expedient embodiment of the nonrotatable connection of the pulley, which is not limited to the use in the transport device according to the invention, provides that the pulley (or any other machine element that can be shifted and is to be provided with torque) is attached to the shaft by means of two opposed freerunning sleeves (which together form a freerunning clutch to the respective conveyor pulley). Since freerunning sleeves act nearly play-free in the blocking direction, the use of two opposed freerunning sleeves provides a nonrotatable connection between the pulley and the shaft in both directions of rotation without any appreciably angular play. In this way it is ensured according to the invention that the belts of the conveyor bodies can be accurately driven and the current X position of the goods (in dynamic and in static operation) can be established correspondingly precisely. Moreover, the two freerunning sleeves remain freely shiftable together along the shaft. The situation would be different with a traditional nonrotatable, but shiftable, connection between pulley and shaft, in which the shaft is profiled in the circumferential direction and the pulley has the corresponding counter profile (for example a square profile). In these cases play can hardly be avoided, which leads to undesirable operational noise and positioning errors. The latter are additionally critical in the case of product processing in a conveyor system when products are to be taken from upstream conveyors or are to be delivered to downstream conveyors.

The freerunning sleeve arrangement is also advantageously suitable for a single- or multi-track transport, inspection, or weighing system. In this case one or more conveyor bodies are provided for each of the individual tracks and these in particular can be driven via a common shaft. For this the shaft can extend through the pulleys or rollers that drive the belts or bands of the individual conveyor bodies and are coupled to them nonrotatably but shiftably by the freerunning sleeves. In this way individual conveyor bodies can be freely shifted along the shaft for instance to define tracks, track spacings, or, in general, to change the spacings of individual conveyor bodies or to be able to change and set the number of conveyor bodies per track.

In a further embodiment the driveshaft runs not directly through the drive wheels or rollers of the conveyor bodies, but rather is apart from them. Individual drive connections of the driveshaft to the relevant conveyor bodies are in this case further coupled in a shiftable way to the shaft via the freerunning clutch, and the conveyor bodies or their drive wheels or rollers can correspondingly be shifted in the Y direction (for example along undriven guides) in order to be able to take new positions.

Of course, the bands or belts of the conveyor bodies of such a system, in particular a multitrack weighing system, can also be driven via a plurality of independently operated shafts, each of which drives one or more tracks or their associated bands or belts by means of freerunning sleeves.

The freerunning sleeves can, of course, also be used "in reverse," by a torque being transmitted non-rotatably but shiftably from a pulley or roller to a shaft.

The two freerunning sleeves can preferably be pressed, bonded, or affixed in any other force-fit and/or form-fit way that is substantially known to one skilled in the art into a hub formed on the pulley.

With respect to the conveyor body, the pulley is fixed in the Y direction in that it is bounded on both sides by two deflectors affixed to the conveyor body. Preferably, these deflectors serve at the same time as transfer runners, on which the transported goods can be transferred to a downstream conveyor or can be taken from an upstream conveyor.

According to an advantageous embodiment of the invention, the two motors that each drive an upper and a lower conveyor body are both on the same side (looking in the Y direction) of the conveyor bodies, where they preferably also lie essentially one above the other in the Z direction. This makes wiring easier. In addition, the accidental swapping of the upper conveyor and lower conveyor during assembly is excluded, since the motors in this case would collide with each other. Also, encoders, which can be positioned on the driven shafts in each case for high precision detection of the rotary motion of the motors, then preferably lie on the same side (looking in the Y direction) of the conveyor bodies, likewise preferably essentially one above the other in the Z direction. Through this a common protective housing (in particular made as a hand protection guard) can be provided for both encoders and the wiring also becomes easier.

It is provided according to another advantageous embodiment of the invention that the arrangement of the at least one upper conveyor body with its motor (upper conveyor) is completely removable from the device as a modular unit. This is enabled in that the cross member carrying the conveyor body and its motor are together separable from the spindle nuts. Expediently this takes place via mounts that can be unscrewed or unlatched with the spindle nut, the said mounts in turn accommodating an end of a cross member and, if the motor is also intended to sit in this region, the motor as well. Then the upper conveyor can be removed from the device by simply releasing all four mounts from the four spindle nuts.

This is also correspondingly applicable for the at least one lower conveyor body together with its motor (lower conveyor) with the difference that here the cross members and the motor are not disposed on the spindle nuts, but rather on a mount that is directly connected to the lift column or the frame.

An advantageous embodiment of the invention provides that at least one upper or lower conveyor body projects out in the X direction from the space that is described by the four lift columns. This facilitates the transfer or delivery of the products to/from adjacent transport units. If in addition there is a different X length between the upper and lower conveyor bodies, the free space forming the difference allows the disposal of additional processing tools (printing heads, sensors, labelers, etc.). Preferably, a plurality of carrier openings lying in the X direction, which are available for the cross members to be passed through, are provided on the conveyor bodies. Through this, the X position of a conveyor body relative to the cross members and thus to the lift columns can be changed, as will be clear from the figures described below.

In order to be able to process goods transported by the conveyor system according to the invention during their transport, various processing tools are required. These can include: cameras, scanners, light gates, labeling units or printing units, and other reading and/or labeling means, which are substantially known to one skilled in the art. Because of the suspension of the conveyor bodies on the lift columns according to the invention and the omission of parts of an upper frame, the processing tools can be flexibly disposed at various positions around the conveyor bodies or the goods transported by them. Preferably, this takes place by means of at least one carrier unit for holding such processing tools, which is manually or automatically adjustable relative to the base frame in one or more spatial directions (X, Y, Z). In addition or alternatively, individual processing tools can also be directly attached to the conveyor bodies. This gives the advantage that a repositioning of the processing tool when there is a change of the height position, in particular of the upper conveyor body, is not necessary, since the processing tools move together with the conveyor body.

A device according to various embodiments of the invention may be integrated as a module into many different kinds of production lines, by disposing it between a delivery unit and a transfer unit. The free adjustability of the conveyor bodies allows the best possible matching to the products that are to be transported or processed in each case. Also, the upper or lower conveyor bodies ("upper conveyor" or "lower conveyor") that are jointly disposed on the upper or lower cross members can be removed as modules and replaced as desired without, in particular, undertaking structural changes on the device.

Although an embodiment with four spindles at the corners of a rectangle is preferred because of its characteristic stability, basically speaking a design with three lift columns and spindles is also encompassed within the scope of the present invention. These lift columns can be arranged at three of the four corners of a quadrilateral, in particular a rectangle, where each spindle carries a cross member that can be shifted only through it or at least two of the spindles jointly carry at least one cross member.

These and other advantages and features of the invention will be apparent from the following description of representative embodiments, considered along with the accompanying drawings.

BRIEF DESCRIPTION OF THE DRAWINGS

FIG. 9 perspective view showing a portion of the bottom of the base frame with a spindle coupling.

DESCRIPTION OF REPRESENTATIVE EMBODIMENTS

Figure 1:
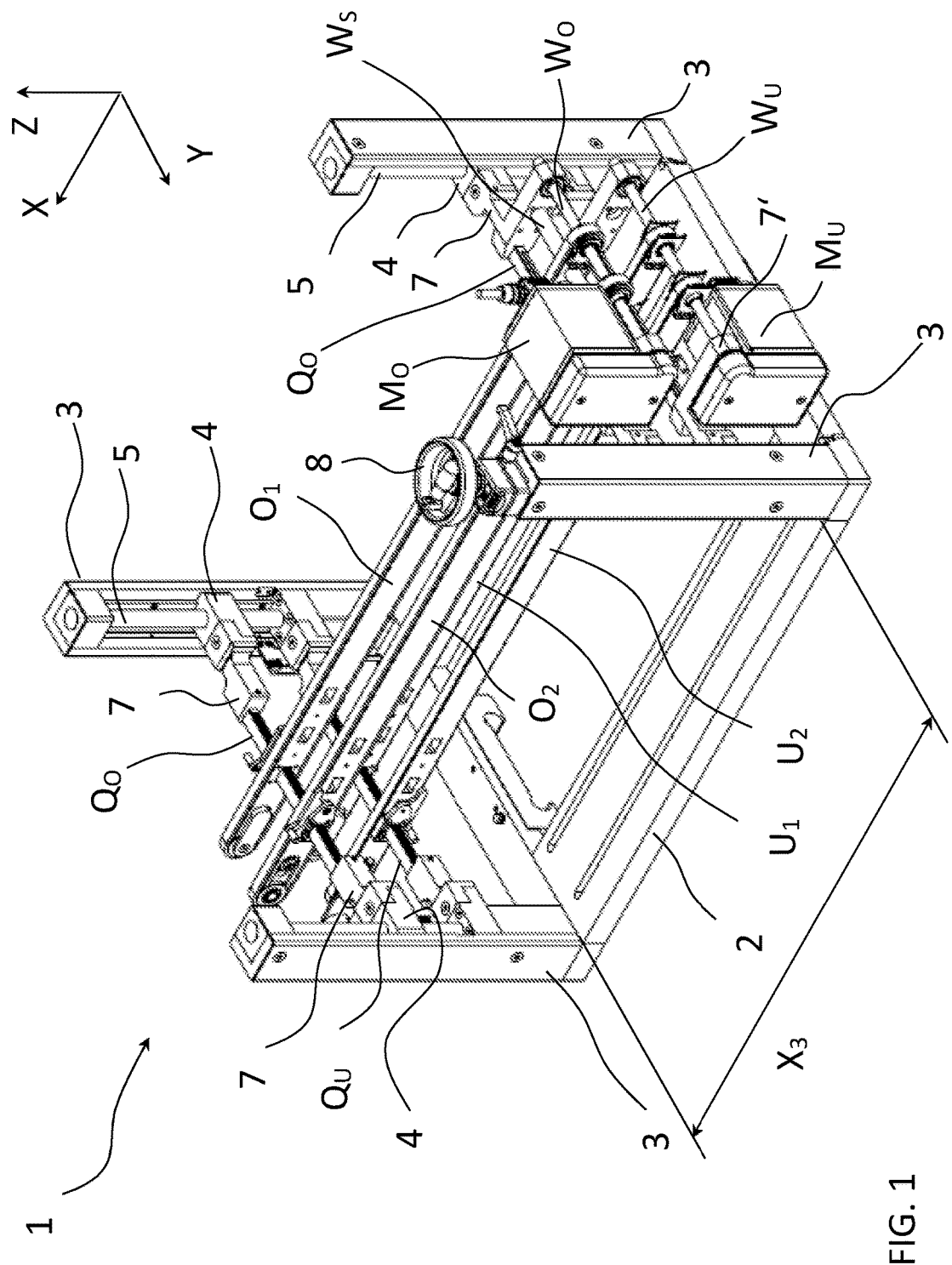
FIG. 1 is a perspective view of a conveyor device according to an embodiment of the invention.

FIG. 1 shows an embodiment of the conveyor device 1 according to the invention in a perspective view. An essentially rectangular base frame 2 extends in a lengthwise direction X and horizontally in a width direction Y running perpendicular thereto. The X coordinate also represents the direction of transport, in which goods are to be transported by the device, where the transport can take place in the X direction or also in the opposite direction. Lift columns 3, which project essentially freely upward in a height direction Z, are disposed at each of the four corners of the base frame 2. Each lift column 3 includes a spindle 5 and a spindle nut 4, which can be moved by the spindle 5 in the Z direction. The illustrated spindles 5 are mounted on suitable bearings at their upper and lower end regions to facilitate rotation of each spindle about its longitudinal axis. Each spindle nut 4 carries a mount 7 (not all of the elements described here are provided with reference numbers in the figures because of the perspective view and for better clarity). The mounts 7 that are opposite from each other in the Y direction each jointly carry an upper cross member $Q_O$. The two upper cross members $Q_O$ project through the front and rear end regions of two upper conveyors bodies $O_1$, $O_2$, which are affixed to the two upper cross members $Q_O$ and spaced apart in the Y direction.

At their lower ends (hidden by base frame 2 in the perspective of FIG. 1), the four spindles 5 of the lift columns 3 are fitted nonrotatably with gears F, around which all together passes a tensioned chain G, which is guided in a groove in base frame 2. A portion of this gear F and chain G arrangement is visible in the view of FIG. 9. The rotation of one spindle is thus synchronously transmitted to all other spindles. The lift column 3 shown in the foreground in FIG. 1 is fitted at the upper end with a hand wheel 8, which is nonrotatably connected to the spindle of this lift column (this particular spindle being obscured in the perspective of FIG. 1). By rotating the hand wheel 8, all spindles 5 are rotated in the same direction via the coupling of the chain G (shown in FIG. 9), so that the spindle nuts 4 seated on the spindles are synchronously moved up or down in the Z direction.

Figure 5:
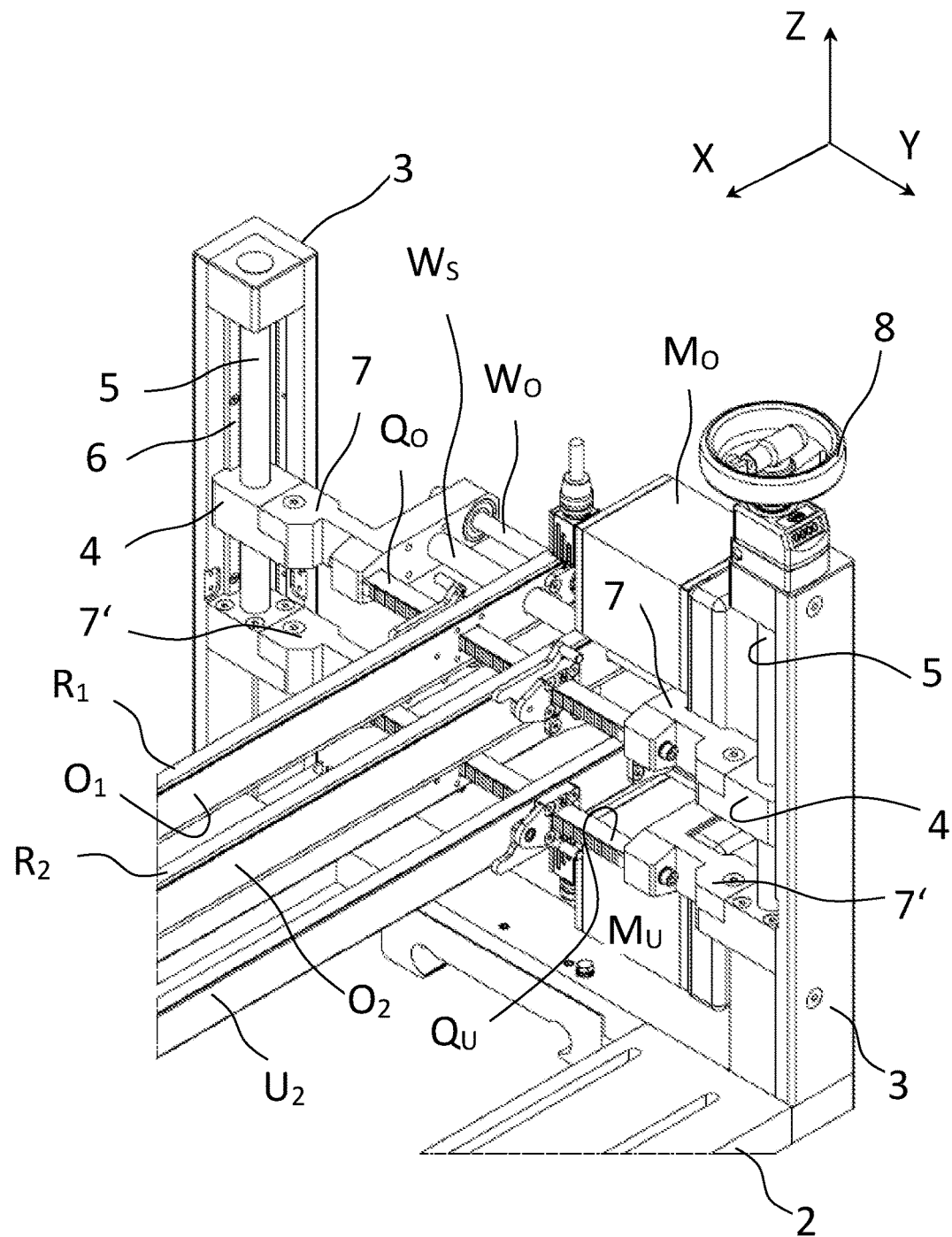
FIG. 5 is a view in perspective showing two lift columns with cross members and motors in between them.
Figure 6:
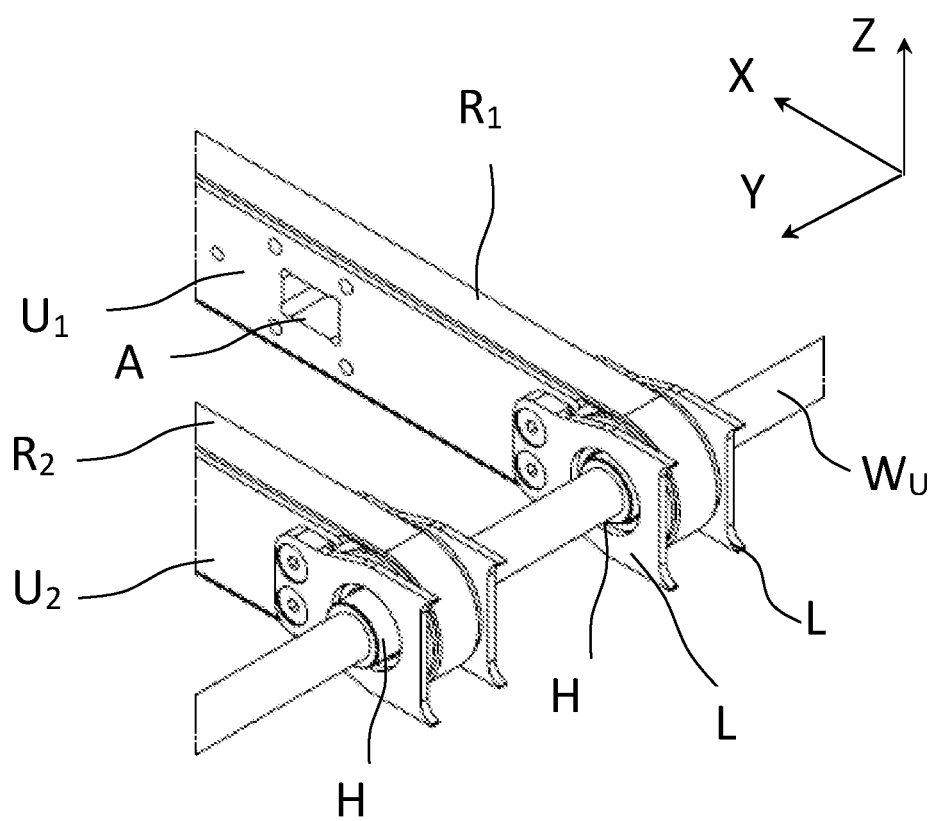
FIG. 6 is an enlarged perspective view showing the use of freerunning sleeves on the drive shaft.
Figure 7:
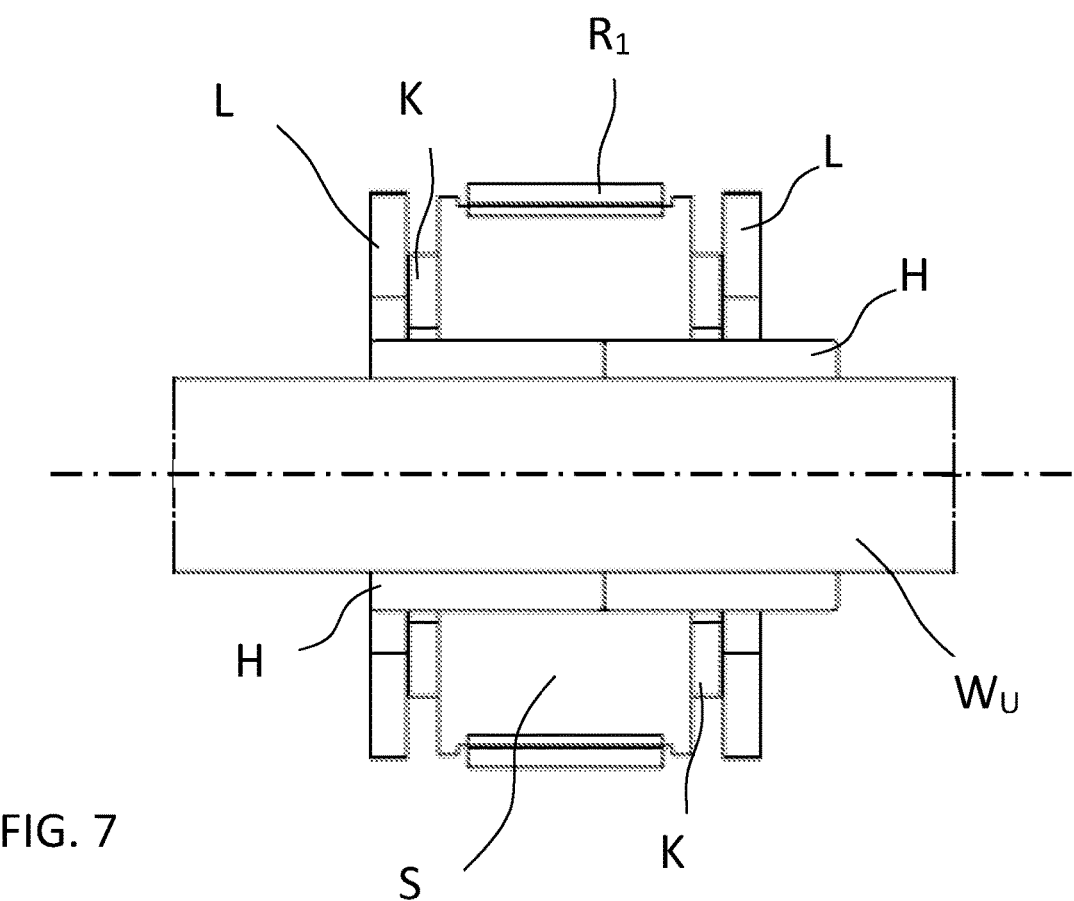
FIG. 7 is an enlarged schematic view through one of the pulleys shown in FIG. 6.

The two upper conveyor bodies $O_1$, $O_2$ each include an endless belt $R_1$, $R_2$ (see particularly FIGS. 3, 4, 5, and 6) which is supported on the respective conveyor body along its lengthwise extent in the Z direction and is reversed at the ends of the conveyor body by two pulleys S (shown in FIGS. 6 and 7). All of the parts turning or driving the belts may be designed to have identical teeth, so that with the belts ($R_1$, $R_2$), which may be toothed belts, parasitic frequencies generated by the drive can advantageously be reduced, in particular to just one. One of the pulleys S of each upper conveyor body $O_1$, $O_2$ is driven by means of an upper motor $M_O$ as is apparent from FIG. 1 (and the enlarged views of FIGS. 6 and 7). The illustrated upper conveyor body drive arrangement includes a motor shaft $W_O$ extending in the Y direction through both pulleys S of the two upper conveyor bodies, and each of these pulleys is disposed on the shaft $W_O$ nonrotatably, but moveably in the Y direction. The motor $M_O$ driving the two upper conveyor bodies $O_1$, $O_2$ is affixed together with the upper cross member $Q_O$ to the mounts 7 of the spindle nuts 4, so that the motor $M_O$ together with the cross member $Q_O$ follows a vertical travel of the spindle nuts 4 as the upper conveyor bodies $O_1$, $O_2$ are positioned at a desired level in the Z direction. In addition to the upper cross member $Q_O$, the form of the apparatus shown in FIG. 1 includes on the motor-side end of the upper conveyor bodies $O_1$, $O_2$ a stabilization shaft $W_S$ between the mounts 7 through the upper conveyor bodies $O_1$, $O_2$ This stabilization shaft $W_S$ helps to support the upper conveyor bodies $O_1$, $O_2$ and to keep the shaft $W_O$ driven by the motor $M_O$ largely free of bending torque or tensile/compressive stresses.

The illustrated apparatus includes, under the upper conveyor bodies $O_1$, $O_2$ two lower conveyor bodies $U_1$, $U_2$. These lower conveyor bodies are also supported via two lower cross members $Q_U$ (of which only one can be seen in FIG. 1) on the lift columns 3. The lower cross members $Q_U$ in this particular embodiment are essentially fixed in place on the lift columns 3 and in particular cannot be moved in the vertical direction Z via the arrangement of spindles 5 and spindle nuts 4.

The two lower conveyor bodies $U_1$ and $U_2$ are, similar to the upper conveyor bodies, driven by a motor $M_U$, which is disposed under the motor $M_O$ in the Z direction. The two motors $M_O$, $M_U$ thus lie (in the Y direction) on the same side of the conveyor bodies in the illustrated apparatus, which simplifies wiring and prevents an accidentally reversed assembly. The upper motor $M_O$ projects upward in the Z direction to the upper side turned away from the upper conveyor bodies $O_1$, $O_2$. Correspondingly, the lower motor $M_U$ projects downward in the Z direction to the lower side turned away from the lower conveyor bodies $U_1$, $U_2$. The space between the motors is thus advantageously left free for the transported goods.

Discrete goods are transported between the upper and the lower conveyor bodies $O_1$, $O_2$, $U_1$, $U_2$, by driving the conveyor body belts in the X direction through the conveyor system, where the goods can be processed by various processing tools during this travel, i.e., preferably while the goods are moving.

Figure 2:
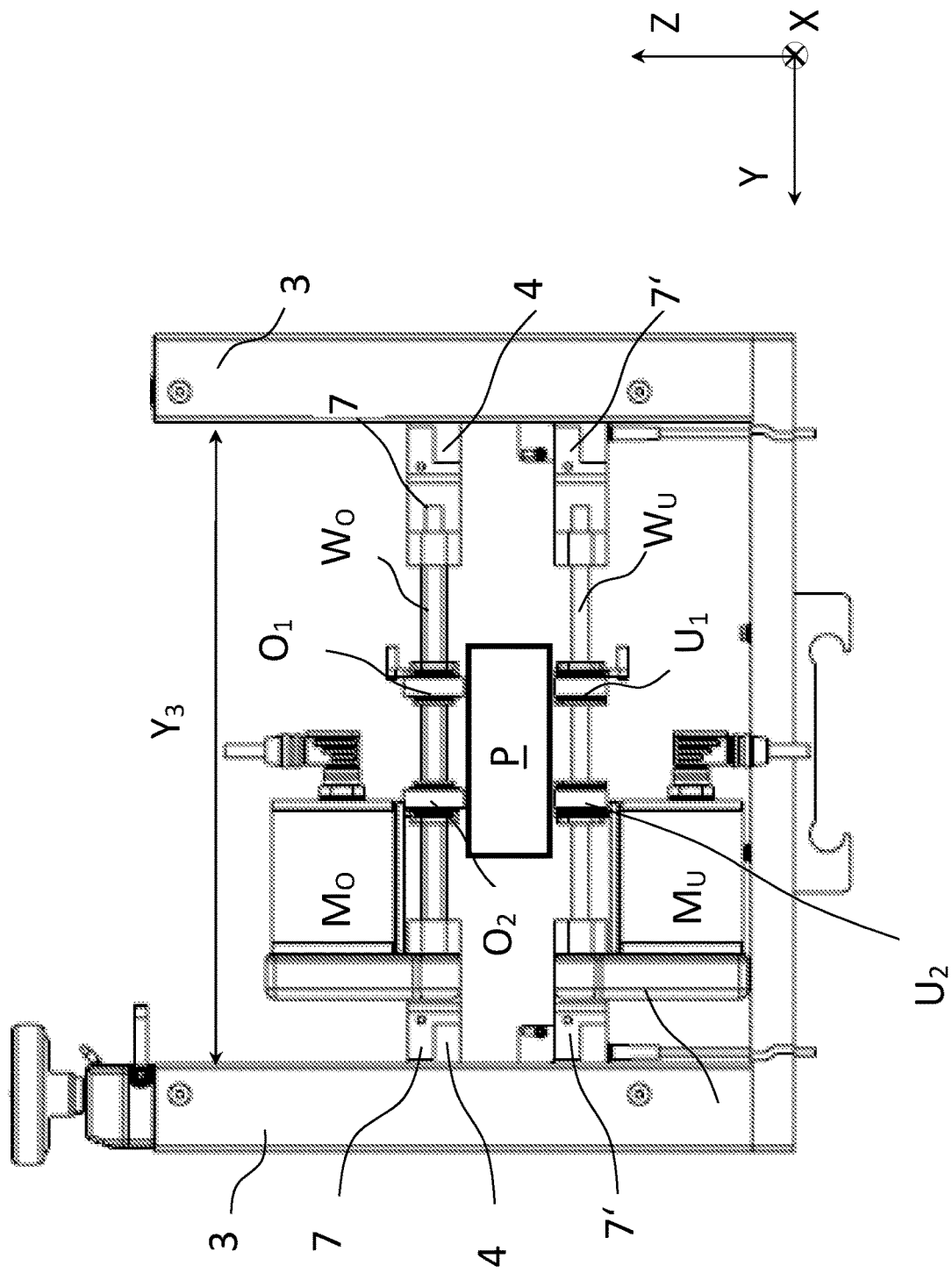
FIG. 2 is an end view of the device shown in FIG. 1, with a representation of a product held between the upper and lower conveyor bodies.

FIG. 2 shows the device in FIG. 1 with a view in the X direction. This view shows two lift columns 3, which have a clear space $Y_3$ between them in the Y direction. A product P to be transported in the X direction (in this case out from the plane of the drawing) is disposed between the upper and lower conveyor bodies $O_1$, $O_2$, $U_1$, $U_2$. In particular, product P is clamped in the height direction Z between upper surfaces defined by the upper conveyor bodies $O_1$, $O_2$ and lower surfaces defined by lower conveyor bodies $U_1$, $U_2$. As will described further below the upper and lower surfaces in this illustrated form of the apparatus comprise conveyor belts. It is apparent from FIG. 2 that both upper conveyor bodies $O_1$, $O_2$, are driven by the upper motor $M_O$, the shaft $W_O$ of which extends through both pulleys of the two upper conveyor bodies in the Y direction (the pulleys being essentially obscured in this view by portions of the upper conveyor bodies $O_1$, $O_2$ and thus not labeled in this view). In the same way the two lower conveyor bodies $U_1$, $U_2$ are driven by the lower motor $M_U$. One can also see in FIG. 2 that the two upper conveyor bodies $O_1$, $O_2$, along with motor $M_O$ with cross member and shafts together as the "upper conveyor" are disposed via the two mounts 7 on the spindle nuts 4, which can be moved up and down along the lift columns 3 by means of the spindles 5 (the spindles being hidden in this view). The lower conveyor bodies $U_1$, $U_2$ and their motor $M_U$ (together with which they may be referred to as the "lower conveyor") are likewise mounted via mounts 7' on the lift columns 3. The mounts 7', however, are different from the mounts 7 in that mounts 7' are essentially fixed in place and not vertically movable via the spindles (5 shown in FIG. 1).

One can further readily see in FIG. 2 that the passageway available for the goods P to be transported is determined on the one hand by the vertical spacing of the upper and lower conveyor bodies $O_1$, $O_2$, $U_1$, $U_2$ and on the other hand by the horizontal spacing $Y_3$ of the two (or all four) lift columns 3. Through the arrangement of the motors $M_O$, $M_U$ above and below the conveyor bodies, this passageway is advantageously left completely free in order to be able to transport goods with maximum Y width.

Figure 3:
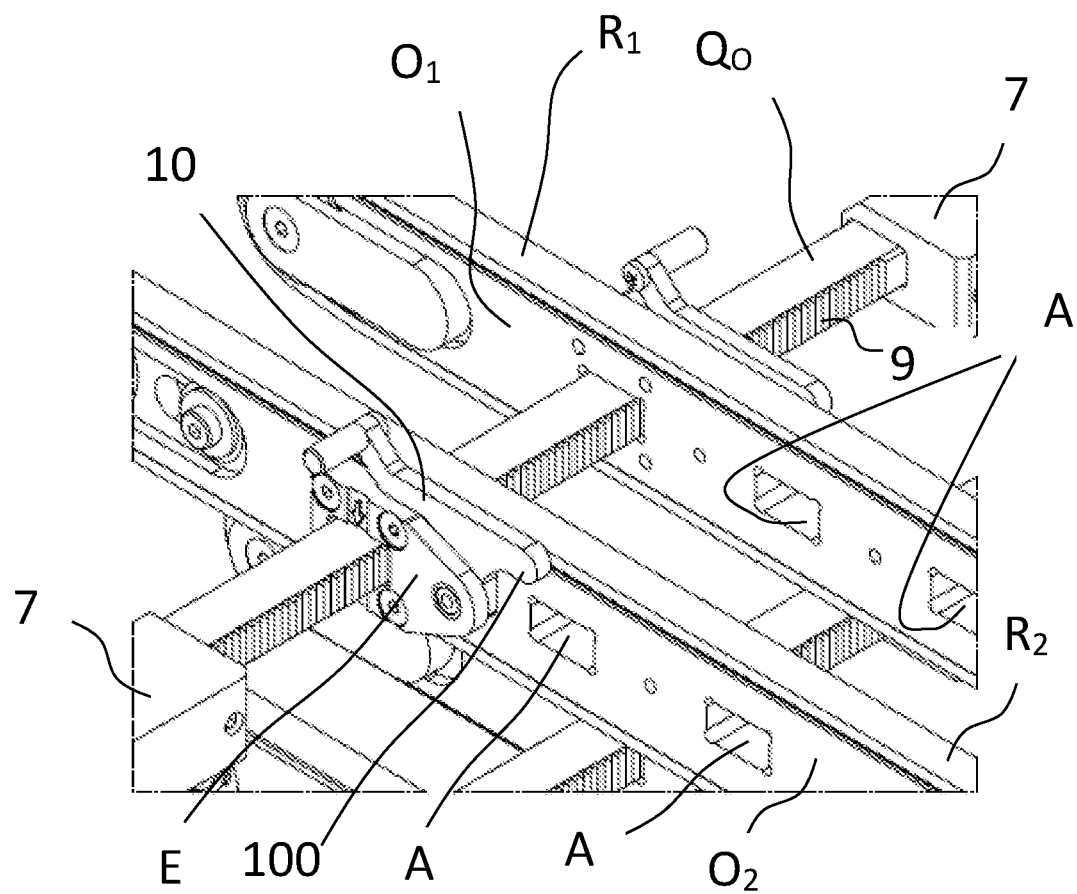
FIG. 3 is an enlarged perspective view of a portion of the device shown in FIG. 1 showing latching levers in an operating position to latch the conveyor bodies in place along the cross member.
Figure 3:
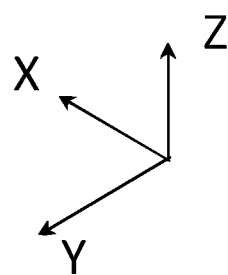

FIG. 3 shows the attachment of the upper conveyor bodies $O_1$, $O_2$ in a more detailed view. In particular, FIG. 3 shows one of the two upper cross members $Q_O$, which passes through both upper conveyor bodies $O_1$, $O_2$ and is mounted by its ends at the mounts 7 (compare FIG. 1). The cross member $Q_O$ is provided along its Y extent with latch teeth 9, the sides of which run parallel to the Z direction. Two latching levers 10, which can be pivoted from a released position to an operating position and back, are disposed on each conveyor body $O_1$ and $O_2$. In the operating position shown in FIG. 3, an intermediate part E attached to the latching lever 10, engages the latch teeth 9 of the cross member $Q_O$ in the X direction so that the intermediate part E and, with it, the relevant conveyor body cannot be shifted from its Y position, which is determined by the latch teeth.

Figure 4:
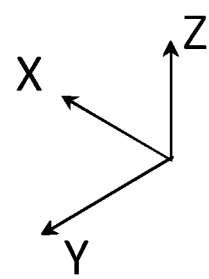
FIG. 4 is an enlarged perspective view similar to the view of FIG. 3 but showing the latching levers in a released position.
Figure 4:
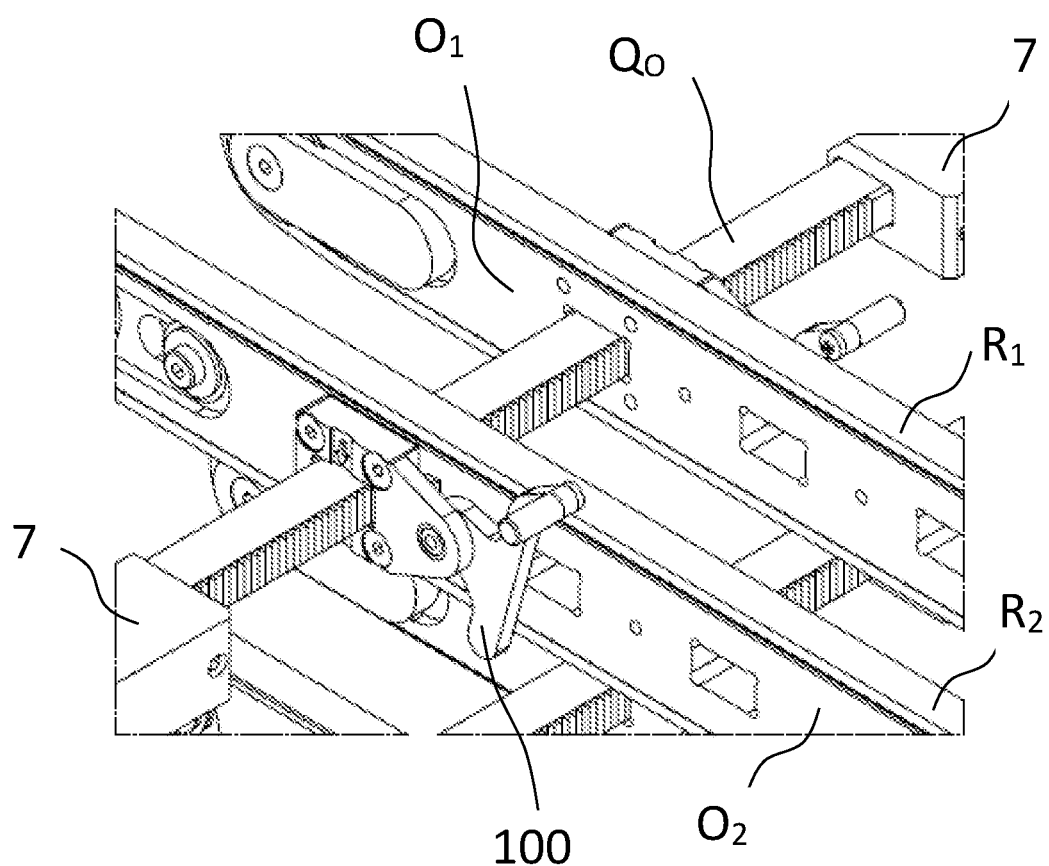

In FIG. 4 the latching mechanism with the latching lever 10 is shown in the released position. In this case the intermediate part E no longer is engaged with the latch teeth 9 of the cross member $Q_O$, so that the respective conveyor body can be freely shifted in the Y direction. At the same time, a free end 100 of the latching lever 10 projects in the Z direction to the region between the lower and upper conveyor bodies. Transport of a product is prevented in this case and the system operator will immediately recognize that the conveyor bodies are not yet secured in their Y position. Preferably, all components of each latching mechanism include individual parts that are connected together and thus captive. By coloring the latching lever 10 a special color, for instance bright red, its current pivot position (either the operating position or released position) can be made recognizable particularly easily. By a scale disposed on the cross members and/or additional positioning aids, for instance a ball latching mechanism (not shown), specific Y positions can be set for the conveyor bodies particularly easily.

Expediently, at least two latching mechanisms spaced apart in the X direction are disposed on each conveyor body in order to ensure the alignment of each conveyor body parallel to the transport direction X. If each conveyor body is held by at least two cross members, one such mechanism can be disposed on each cross member. One can further see on FIGS. 3 and 4 that each conveyor body has a plurality of approximately square-shaped carrier openings A that are spaced apart from each other in the X direction, with one such opening A being penetrated by the cross member $Q_O$. The X position of the conveyor bodies relative to the cross members can be configured by passing the cross members through one of the carrier openings A as desired.

FIG. 5 shows a part of the conveyor device 1 according to the invention in a perspective view looking at two lift columns 3 and the components disposed in between them. One can also see the spindle 5 associated with each lift column, each spindle 5 carrying a spindle nut 4 and a mount 7 disposed thereon for an upper cross member $Q_O$ with two upper conveyor bodies $O_1$, $O_2$ affixed thereto. A linear guide 6, which guides vertically moving spindle nuts 4 along the spindle 5 and safeguards against tilting, can be seen on the lift columns 3 at the back of the drawing in FIG. 5. Such a guide 6 may be provided for the spindle nuts 4 of the device on all lift columns 3.

The mount 7 shown in FIG. 5 on the right side and supported by the spindle nut 4 carries, on the one hand, the upper cross member $Q_O$ and, on the other, the upper motor $M_O$. The spindle 5 of the front lift column 3 (and through the coupling by means of a chain or toothed belt, not shown, the three other spindles as well) can be operated via the hand wheel 8 situated at the upper end of the lift column shown in the foreground.

FIG. 5 also shows the latching mechanism (including latching levers 10) provided on each conveyor body, which establishes the Y position of the conveyor bodies along the cross member, which is designed as a gear rack.

The lower drive shaft $W_U$ that can be seen in FIG. 1 is shown in FIG. 6 in an enlarged partial view. The shaft $W_U$ projects through two pulleys S of the two lower conveyor bodies $U_1$ and $U_2$. Each pulley S is mounted on the shaft $W_U$ nonrotatably, but with the ability to shift in the Y direction in order to enable the ability of the entire conveyor body to be shifted in the Y direction. The nonrotatable connection of the pulley on the shaft $W_U$ takes place by two oppositely rotating freerunning sleeves H into the hub of each of the two pulleys S as shown particularly in FIG. 7. The freerunning sleeves H are freely movable in the Y direction on the shaft $W_U$ and are fixed on the inside diameter of the pulley at their outer side, due to being pressed in. The oppositely rotating freerunning sleeves H form a nonrotatable connection of the relevant pulley S with the shaft $W_U$ with extremely small play in the circumferential direction while at the same time having very easy shiftability in the Y direction. The Y position of each pulley is fixed relative to the conveyor body in this embodiment, preferably without axial play, through two deflectors L adjacent on the sides of each pulley S and affixed to the conveyor body. Plastic disks K with good slip properties are disposed between the deflectors L and the pulley S in the axial direction for a mount that is as friction free as possible. The deflectors L have a slightly conical outline on the end facing away from the conveyor body, with which they can connect to adjacent conveyor devices or conveyor belts, so that the products to be received from such devices or to be sent to such devices can be transferred with as few problems as possible.

Figure 8:
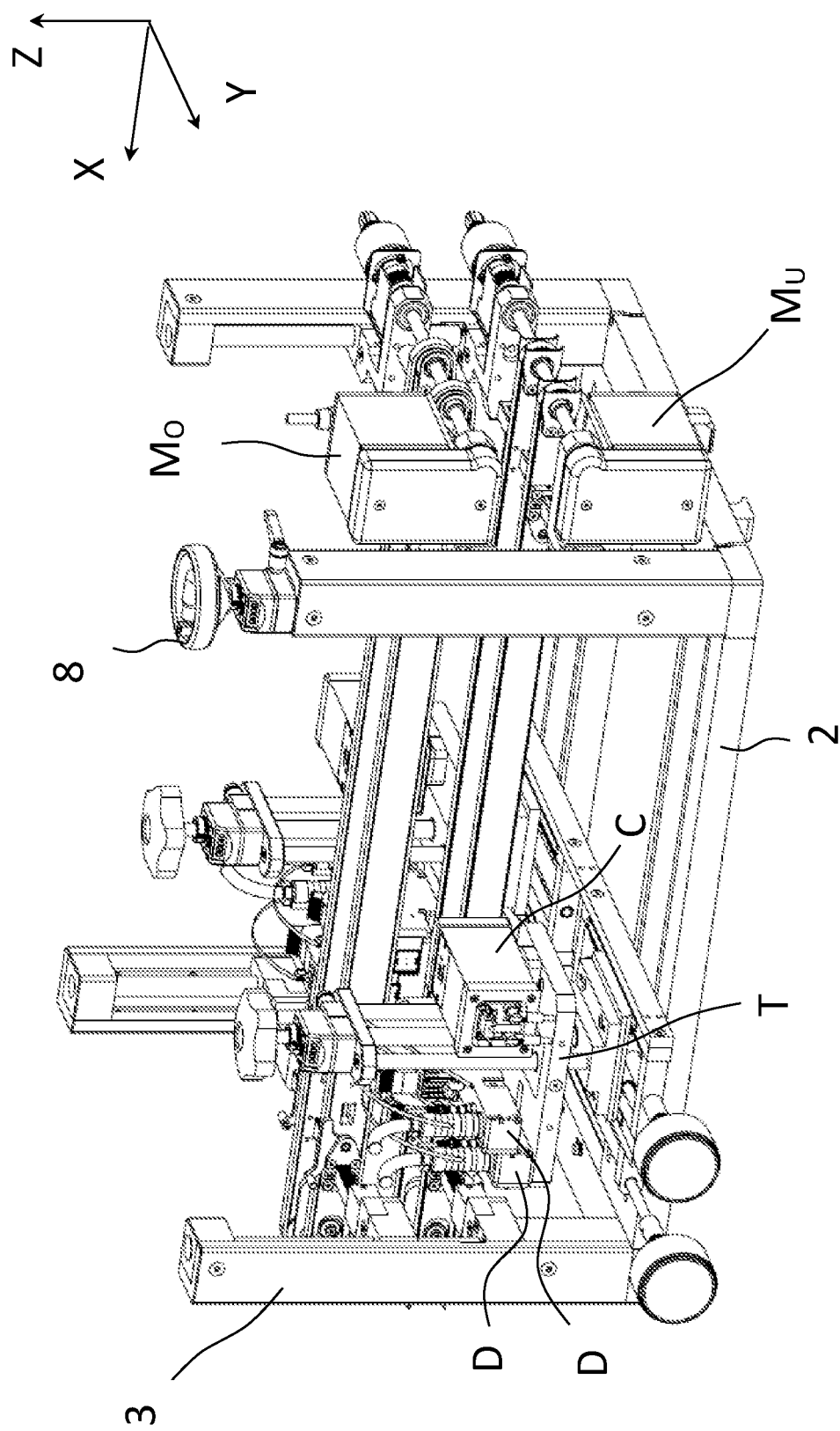
FIG. 8 is a perspective view of the device shown in FIG. 1, but with processing tools added.

FIG. 8 shows a device similar to that shown in FIG. 1, but additionally including carrier T disposed directly on the base frame 2. The carrier T can be moved in space in the X, Y, and Z directions relative to the base frame 2 or relative to the upper and lower conveyor bodies $O_1$, $O_2$, $U_1$, $U_2$ via a cross table and a lift mechanism. A camera C and two print heads D are disposed on the carrier T as processing tools, which can process a product transported by the conveyor bodies on the side between the upper and lower conveyor bodies. Another carrier, not shown in this perspective, with like adjustability and processing tools is disposed on the back side of the device, which is facing away from the viewer, where said tools can differ from those of the first carrier T in type and position. A plurality of carriers T can also be synchronously positionable, for instance by means of linear drives supplying two carriers at the same time.

FIG. 9 shows in a simplified partial view the nonrotatable coupling of the spindle 5 of a lift column 3 to the other spindles. A segment of the base frame 2 is shown at an angle from below in perspective view. From the lift column 3 situated at one corner of the base frame 2, its spindle 5 (only a bottom connector of which is visible in this perspective) extends through the base frame downward, where a gear F is connected nonrotatably to the spindle 5. A chain G, which is shown in a simplified form, runs in a groove in base frame 2 and wraps around the gear for about 90°. Although not shown in the partial view of FIG. 9, the chain G may run to the other spindles of the other lift columns, which are made in the same way, and is adjustably tensioned. The chain G running around all the spindles transfers the torque introduced through one of the spindles, for example, by means of hand wheel 8 in FIG. 1, to all of the other spindles, so that their spindle nuts can be moved up and down synchronously.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, and the like with reference to a given feature are intended only to identify a given feature and distinguish that feature from other features. Unless specifically stated otherwise, such terms are not intended to convey any spatial or temporal relationship for the feature relative to any other feature.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE NUMBER LIST

A Carrier opening
C Camera
D Print head
E Intermediate part
F Gear
G Chain
H Freerunning sleeve
K Plastic disk
L Deflector
$M_O$, $M_U$ Upper/lower motor
$O_1$, $O_2$ Upper conveyor bodies
P Goods to be transported (product)
$Q_O$, $Q_U$ Upper/lower cross member
$R_1$, $R_2$ Belts
S Pulley
T Carrier
$U_1$, $U_2$ Lower conveyor bodies
$W_O$, $W_U$ Upper/lower motor shafts
$W_S$ Stabilizing shaft
X Lengthwise direction
Y Width direction
Z Height direction
$X_3$ X spacing of two lift columns
$Y_3$ Y spacing of two lift columns
1 Conveyor system
2 Base frame
3 Lift column
4 Spindle nut
5 Spindle
6 Linear guide
7, 7' Mount
8 Hand wheel
9 Latching teeth
10 Latching lever
100 Segment on latching lever

The invention claimed is:
1. A conveyor system including:
(a) a base frame extending in a transport direction and in a width direction, the width direction extending horizontally transverse to the transport direction;
(b) at least one lower conveyor body defining a lower surface extending in the width direction, the at least one lower conveyor body being directly or indirectly supported on the base frame at a position in a height direction extending perpendicular to the transport direction and width direction;
(c) a respective lift column located at each of at least three corners of an imaginary quadrilateral lying in a plane defined by the transport direction and the width direction, each lift column being connected to the base frame and extending in the height direction from an upper side of the base frame, each lift column including a respective lifting mechanism with a spindle nut having a position that is adjustable along the respective lift column in the height direction;
(d) at least one upper conveyor body defining an upper surface extending in the width direction, the at least one upper conveyor body being supported on the lifting mechanisms of the lift columns so that a spacing between the at least one upper conveyor body and the at least one lower conveyor body may be varied in the height direction via the lifting mechanisms to facilitate clamping an object to be conveyed by the conveyor system between the lower surface and upper surface as the object is conveyed in the transport direction; and
(e) wherein the lift columns include at least one lift column that is not connected to any other one of the lift columns by a lengthwise connector extending in the transport direction above the spindle nut of the at least one lift column.

2. The conveyor system of claim 1 wherein the at least one lift column is not connected to any other of the lift columns by a transverse connector extending in the width direction above the spindle nut of the at least one lift column.

3. The conveyor system of claim 1 wherein the lift columns include at least two lift columns that each freely project in the height direction above their respective spindle nut without either a lengthwise connector or a transverse connector to other lift columns.

4. The conveyor system of claim 1 wherein a spacing between adjacent lift columns in the transport direction at a position along the height direction above the at least one lower conveyor body is at least half as large as the length of the at least one upper conveyor body or at least one lower conveyor body.

5. The conveyor system of claim 1 wherein a spacing between adjacent lift columns in the width direction above the at least one lower conveyor body and under the at least one upper conveyor body determines a maximum dimension in the width direction for accepting goods to be transported by the conveyor system.

6. The conveyor system of claim 1 wherein the lifting mechanism of each lift column includes a respective spindle on which the respective spindle nut is adjustable in the height direction, and wherein the respective lift mechanisms are coupled to each other via a chain or belt for synchronous activation.

7. The conveyor system of claim 1 further including a respective linear guide for each respective spindle nut operable to guide the respective spindle nut during movement in the height direction to prevent misalignment of the at least one upper conveyor body relative to a plane defined by the transport direction and the width direction.

8. The conveyor system of claim 1 further including a cross member extending from the respective spindle nut or a mount installed on that spindle nut of a first one of the lift columns to the respective spindle nut or a mount installed on that spindle nut a second one of the lift columns that is adjacent to the first one of the lift columns in the width direction, and wherein the at least on upper conveyor body is mounted on the cross member so as to be adjustable in the width direction.

9. The conveyor system of claim 8 wherein the cross member has along its length in the width direction a series of latch teeth, wherein a latching lever coupled to the at least one upper conveyor body is moveable from a released position, in which the latch teeth are released to facilitate movement of the at least one upper conveyor body in the width direction, to an operating position, in which one or more of the latch teeth are latched so as to secure the at least one upper conveyor body in the width direction along the cross member.

10. The conveyor system of claim 9 wherein that the latch lever includes a segment that projects into a region between the at least one upper conveyor body and the at least one lower conveyor body when the latch lever is in the released position in order to block transported goods when the latch lever is not in the released position.

11. The conveyor system of claim 1 further including:
(a) a motor; and
(b) a shaft connected to be driven by the motor and extending in the width direction to a pulley of the at least one upper or at least one lower conveyor body, the pulley being coupled nonrotatably to the shaft, but movably in the width direction.

12. The conveyor system of claim 1 further including:
(a) a cross member extending from a first separable mount connected to the respective spindle nut of a first one of the lift columns to a second separable mount connected to the respective spindle nut of a second one of the lift columns that is adjacent to the first one of the lift columns in the width direction, the at least one upper conveyor body being mounted on the cross member;
(b) a motor for driving the at least one upper conveyor body, the motor being mounted on the cross member; and
(c) wherein the cross member, the at least one upper conveyor body, and the motor are removable as a modular unit from the spindle nut of the first one of the lift columns and the spindle nut of the second one of the lift columns.

13. The conveyor system of claim 1 further including:
(a) a cross member extending from a first one of the lift columns to a second one of the lift columns that is adjacent to the first one of the lift columns in the width direction, the at least one lower conveyor body being mounted on the cross member;
(b) a motor for driving the at least one lower conveyor body, the motor being mounted on the cross member; and
(c) wherein the cross member, the at least one lower conveyor body, and the motor are removable as a modular unit from the first one of the lift columns and the second one of the lift columns.

14. The conveyor system of claim 1 wherein at least one upper conveyor body or lower conveyor body traverses one of the lift columns in the transport direction.

15. The conveyor system of claim 1 further including at least one carrier unit disposed on the base frame, and a least one processing tool mounted on the carrier unit in position to interact with a good transported by the conveyor system.

16. The conveyor system of claim 15 wherein the carrier unit is adjustable in the transport direction, the width direction, and/or the height direction.

\* \* \* \* \*